(12) United States Patent
Yoo et al.

(10) Patent No.: US 8,358,905 B2
(45) Date of Patent: *Jan. 22, 2013

(54) RECORDING MEDIUM HAVING A DATA STRUCTURE FOR MANAGING GRAPHIC INFORMATION AND RECORDING AND REPRODUCING METHODS AND APPARATUSES

(75) Inventors: Jea Yong Yoo, Seoul (KR); Kang Soo Seo, Anyang-si (KR); Byung Jin Kim, Seongnam-si (KR)

(73) Assignee: LG Electronics Inc., Seoul (KR)

( * ) Notice: Subject to any disclaimer, the term of this patent is extended or adjusted under 35 U.S.C. 154(b) by 1524 days.

This patent is subject to a terminal disclaimer.

(21) Appl. No.: 11/606,275

(22) Filed: Nov. 30, 2006

(65) Prior Publication Data

US 2007/0092221 A1 Apr. 26, 2007

Related U.S. Application Data

(63) Continuation of application No. 10/920,169, filed on Aug. 18, 2004, now Pat. No. 7,587,122.

(30) Foreign Application Priority Data

Dec. 26, 2003 (KR) .................. 10-2003-0097528

(51) Int. Cl.
*H04N 9/80* (2006.01)
(52) U.S. Cl. ............... 386/239; 386/281; 386/353
(58) Field of Classification Search .......... 386/239–241, 386/248, 281, 283, 285, 353
See application file for complete search history.

(56) References Cited

U.S. PATENT DOCUMENTS

| | | | |
|---|---|---|---|
| 5,701,385 A | 12/1997 | Katsuyama et al. |
| 6,009,234 A | 12/1999 | Taira et al. |
| 6,088,507 A | 7/2000 | Yamauchi et al. |
| 6,250,928 B1 | 6/2001 | Poggio et al. |
| 6,286,001 B1 | 9/2001 | Walker et al. |
| 6,392,664 B1 | 5/2002 | White et al. |
| 6,424,793 B1 | 7/2002 | Setogawa et al. |
| 6,757,906 B1 | 6/2004 | Look et al. |
| 6,766,101 B1 | 7/2004 | Yamada |
| 6,847,777 B1 | 1/2005 | Nakamura |
| 6,879,769 B1 | 4/2005 | Kawai et al. |
| 6,999,674 B1 | 2/2006 | Hamada et al. |
| 7,113,694 B2 | 9/2006 | Kim et al. |

(Continued)

FOREIGN PATENT DOCUMENTS

CN 1254162 5/2000

(Continued)

OTHER PUBLICATIONS

Office Action for U.S. Appl. No. 10/920,174 dated Dec. 22, 2010.

(Continued)

*Primary Examiner* — Thai Tran
*Assistant Examiner* — Mishawn Dunn
(74) *Attorney, Agent, or Firm* — Harness, Dickey & Pierce, P.L.C.

(57) ABSTRACT

In one embodiment, the method includes reading a play list including at least one subplayitem, the subplayitem including navigation information for a clip file including the graphic information. The graphic information is preloaded before starting reproduction of the playlist, and the graphic information is reproduced on the basis of the subplayitem.

29 Claims, 11 Drawing Sheets

U.S. PATENT DOCUMENTS

| | | |
|---|---|---|
| 7,236,687 B2 | 6/2007 | Kato et al. |
| 7,237,252 B2 | 6/2007 | Billmaier |
| 7,260,782 B2 | 8/2007 | Wallace et al. |
| 7,454,714 B2 | 11/2008 | Totman et al. |
| 7,509,581 B1 | 3/2009 | Song et al. |
| 7,548,565 B2 | 6/2009 | Sull et al. |
| 7,743,329 B2 | 6/2010 | Rahman et al. |
| 2001/0010757 A1 | 8/2001 | Mori et al. |
| 2001/0014894 A1 | 8/2001 | Han et al. |
| 2002/0104096 A1* | 8/2002 | Cramer et al. ............ 725/113 |
| 2002/0135607 A1 | 9/2002 | Kato et al. |
| 2002/0174430 A1 | 11/2002 | Ellis et al. |
| 2003/0028892 A1 | 2/2003 | Gewickey et al. |
| 2003/0147629 A1 | 8/2003 | Kikuchi et al. |
| 2003/0161615 A1 | 8/2003 | Tsumagari et al. |
| 2004/0047591 A1 | 3/2004 | Seo et al. |
| 2004/0070628 A1 | 4/2004 | Iten et al. |
| 2007/0133948 A1 | 6/2007 | Kikuchi et al. |

FOREIGN PATENT DOCUMENTS

| | | |
|---|---|---|
| CN | 1264894 | 8/2000 |
| CN | 1272210 | 11/2000 |
| EP | 0724264 | 7/1996 |
| EP | 0 357 407 B1 | 3/1997 |
| EP | 0788106 | 8/1997 |
| EP | 0 624 876 B1 | 1/1999 |
| EP | 0913822 A1 | 5/1999 |
| EP | 1005043 A1 | 5/2000 |
| EP | 1 103 974 | 5/2001 |
| EP | 1115119 A2 | 7/2001 |
| EP | 1 198 133 | 4/2002 |
| EP | 1 223 580 A2 | 7/2002 |
| EP | 1 465 047 A1 | 10/2004 |
| JP | 2000-152141 | 5/2000 |
| JP | 2000-333126 | 11/2000 |
| JP | 2001-126451 | 5/2001 |
| JP | 2001-251565 | 9/2001 |
| JP | 2003-123389 | 4/2003 |
| JP | 2003-230104 | 8/2003 |
| JP | 2003-249057 | 9/2003 |
| JP | 2003-264787 | 9/2003 |
| JP | 2007-515025 | 6/2007 |
| JP | 4485532 | 6/2010 |
| RU | 2180470 | 3/2002 |
| RU | 2233011 | 7/2004 |
| TW | 449737 | 8/2001 |
| TW | 501131 | 9/2002 |
| TW | 545072 | 8/2003 |
| WO | WO 97/07504 | 2/1997 |
| WO | WO 97/37491 | 10/1997 |
| WO | WO 00/36600 | 6/2000 |
| WO | WO 01/35409 | 5/2001 |
| WO | WO 01/45102 | 6/2001 |
| WO | WO 03/085972 | 10/2003 |
| WO | WO 2004/028157 A1 | 4/2004 |
| WO | WO 2005/011272 | 2/2005 |
| WO | WO 2005/036546 | 4/2005 |
| WO | WO 2005/048261 | 5/2005 |
| WO | WO 2005/048592 | 5/2005 |

OTHER PUBLICATIONS

Notice of Allowance for counterpart Japanese Patent Application No. 2006-546802 dated Mar. 16, 2010 with English translation.
English language Abstract for Japanese Patent Application No. 2006-522391 dated Sep. 28, 2006.
Chinese Office Action dated Apr. 26, 2011 issued in corresponding Chinese Application No. 200480032681.
Office Action dated Jun. 25, 2010 by the Japanese Patent Office for Application No. 2006-546801 (without English translation).
International Search Report, dated May 11, 2005.
Office Action for corresponding Russian Application No. 2006116879/28 (018356) dated Oct. 29, 2009.
Office Action for corresponding European Application No. 04 774 353.9 dated Dec. 16, 2009.
Taiwanese Office Action corresponding to Taiwanese Application No. 093129502 dated Dec. 31, 2008.
Japanese Office Action dated Mar. 15, 2011 issued in corresponding Japanese Application No. 2010-035955.
PCT International Search Report and Written Opinion dated Apr. 5, 2005.
European Office Action dated May 15, 2009.
Japanese Office Action dated May 22, 2009 with English translation.
Russian Office Action dated Jun. 22, 2009 with English translation.
Russian Notice of Allowance dated Sep. 17, 2009 with English translation.
United States Office Action dated Oct. 14, 2009.
Notice of Allowance for Japanese patent application No. 2006-546801 mailed on Aug. 19, 2011 (with English translation).
Office Action for corresponding Japanese patent application No. 2010-035955 dated Sep. 27, 2011.
Malaysian Examination Report for corresponding Malaysian patent application No. PI 20043442 dated Nov. 15, 2011 (in English).
Office Action for corresponding U.S. patent application No. 11/606,281 dated Nov. 25, 2011.
Office Action for corresponding U.S. Appl. No. 10/920,174 dated Mar. 6, 2012.
Office Action for corresponding Taiwanese patent application No. 096143 908 dated Feb. 20, 2012 with English translation.
Office Action for corresponding U.S. Appl. No. 10/920,174 dated Jul. 18, 2012.
Notice on the Third Office Action for corresponding Chinese patent application No. 200480032785.5 dated Sep. 5, 2012 with English translation.

* cited by examiner

RECORDING MEDIUM HAVING A DATA STRUCTURE FOR MANAGING GRAPHIC INFORMATION AND RECORDING AND REPRODUCING METHODS AND APPARATUSES

CROSS-REFERENCE TO RELATED APPLICATIONS

This application is a continuation of U.S. patent application Ser. No. 10/920,169 (U.S. Pat. No. 7,587,122) filed on Aug. 18, 2004, the entirety of which hereby is incorporated herein by reference.

This application claims the benefit of the Korean Application No. 10-2003-97528 filed on Dec. 26, 2003 which is hereby incorporated by reference.

BACKGROUND OF THE INVENTION

1. Field of the Invention

The present invention relates to high density recording media such as read-only blu-ray discs (BD-ROM) and methods and apparatuses associated therewith.

2. Discussion of Related Art

Generally, an optical disk on which a large capacity of data is recordable is widely used as an optical record medium. Recently, many efforts have been made to develop a new high density optical record medium (HD-DVD) on which video data of high definition and audio data of high quality can be recorded and stored, such as a blu-ray disk (hereinafter abbreviated BD) and the like.

The blu-ray disk (BD) as a next generation HD-DVD technology is the next generation optical record solution enabling storage of data that remarkably surpasses previous DVD. The technology specifications of global standards for the BD are being established together with other digital equipment standards.

Although many efforts have been made to develop optical reproducing players adopting the BD specifications, there are many difficulties in developing a complete optical reproducing player since the BD specifications have not been fully established yet.

Particularly, for effective reproduction of data from the Blu-ray Disc (BD), menu information must be organized and provided so that through interaction with the user, selective data reproduction may take place. However, in the present Blu-ray Disc (BD) standards, because consolidated standards of the supplementary data, particularly the menu information are not complete yet, there are many restrictions on the development of a Blu-ray Disc (BD) optical reproducing apparatus, which causes problems with reproducing the menu information and providing it to the user according to a request of the user.

SUMMARY OF THE INVENTION

The present invention relates to a method of reproducing graphic information.

In one embodiment, the method includes reading a play list including at least one subplayitem, the subplayitem including navigation information for a clip file including the graphic information. The graphic information is preloaded before starting reproduction of the playlist, and the graphic information is reproduced on the basis of the subplayitem.

The present invention also relates to an apparatus for reproducing graphic information. In one embodiment, the apparatus includes a controller for checking a playlist including at least one subplayitem. The subplayitem includes navigation information for a clip file, which includes the graphic information. The controller controls preloading of the graphic information before starting reproduction of the playlist, and controls reproduction of the graphic information on the basis of the subplayitem.

The present invention still further relates to a recording medium having a data structure for managing graphic information.

In one embodiment, the data structure includes at least one stream file for the graphic information, and at lest one playlist including a least one subplayitem. The subplayitem provides navigation information for reproducing the stream file, and the stream file is preloaded before starting reproduction of playlist.

The present invention also relates to methods and apparatuses for creating a data structure for managing graphic information, and for recording a data structure for managing graphic information.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the embodiments of the present invention, examples of which are illustrated in the accompanying drawings. Wherever possible, the same reference numbers will be used throughout the drawings to refer to the same or like parts. While terms used in the present invention are possibly selected from currently well-known terms, terms are arbitrarily chosen by the applicant in some cases and their meanings are explained in detail in the following description. Hence, the present invention should be understood with the meanings of the corresponding terms chosen by the applicant instead of the simple names of the terms.

Figure 1:
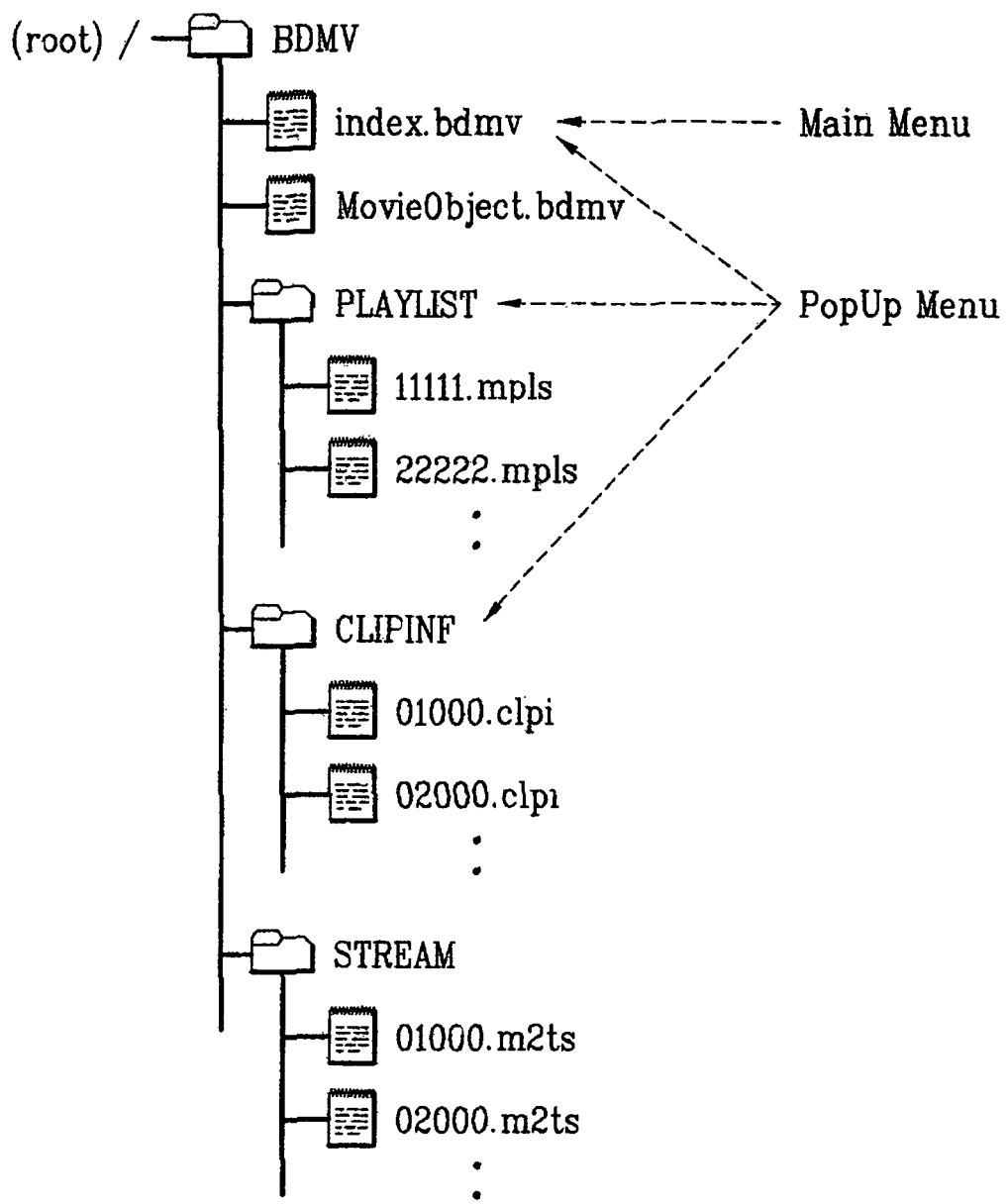
FIG. 1 illustrates a file structure of a high density optical disc in accordance with one embodiment of the present invention.

First of all, the file structure and recording medium format for data playback management adopted by the present invention are explained in detail by referring to FIG. 1 and FIG. 2 below. FIG. 1 illustrates a file structure of a high density optical disc in accordance with one embodiment of the present invention. As shown, the file structure includes at least one BD directory BDMV under a root directory. In the BD directory BDMV, an index file index.bdmv and an object file MovieObject.bdmv are included as general file (upper file) information. Moreover, three directories, which have playback management and navigation information for the data recorded on the recording medium (e.g., a Blu-ray Disc) are recorded in the BD directory BDMV. The three directories are a playlist directory PLAYLIST, a clip information directory CLIPINF, and a stream directory STREAM. The three directories and the files included therein will be explained in detail below.

Files for video and audio streams, which are called an 'AV stream', are recorded according to specific formats in the stream directory STREAM. For instance, '*.m2ts' is used as each extension name of AV stream files (e.g., 01000.m2ts and 02000.m2ts) since the AV stream files are generally recorded as MPEG2 transport packets. In the BD specification, the AV stream is named a clip stream file. Relating to the present invention, the data recorded in the disk will exist in the form of the AV stream file.

The clipinfo directory CLIPINF consists of clipinfo files 01000.clpi and 02000.clpi having a one-to-one correspondence with the AV stream files (*.m2ts), respectively. Specifically, attribute information and tiling information of an AV stream are recorded in the corresponding clipinfo file (*.clpi). The timing information includes information on mapping a presentation time stamp (PTS) of data in the AV stream file to a source packet number of a source packet in the AV stream file. Typically this map is referred to as an entry point map. In the BD standard, the AV stream file *.m2ts and the corresponding clipinfo file *.clpi are collectively called a "clip". Accordingly, the file "01000.clpi" in the clipinfo directory CLIPINF has attribute information and timing information on the file "01000.m2ts" in the stream directory, and the files "01000.clpi" and "01000.m2ts" form a clip.

The playlist directory PLAYLIST includes playlist files (*.mpls), and each of the playlist files (*.mpls) includes at least one playitem designating a playing interval of a specific clip. The playitem has navigation information on a play starting time (In-Time) and play end time (Out-Time) of a particular clip desired to play, i.e., designated by the clip name given in a Clip_Information_File field in the playitem. Moreover, the playlist file *.mpls may be provided with a subplayitem as necessary, such as when data is to be played non-synchronized with the playitem.

In the BD directory BDMV, there are an index file index.bdmv and an object file Object.bdmv as general files for securing user interactivity. The index file index.bdmv includes an index table index Table having main menu information and title information the user can select.

Particularly, the main menu information recorded in the index Table is called a main menu or a top menu. In relation to this, the subject disclosure introduces a popup menu, which is newly defined as new menu information separate from the main menu. A popup menu may provide detailed menu information according to the data attributes of a specific reproducing or playback unit (e.g., title, chapter, scene, etc.), and may be provided through a small window in the display that may overlap a currently reproduced picture in some cases.

Accordingly, the popup menu managing information is provided in each title. For example, a title may be divided into chapters each represented by one of a plurality of reproduction units, and popup menu information may be associated with each reproduction unit. Also, popup menu information may be provided as part of a playlist file (*.mpls), a clipinfo file (*.clpi), etc. Below, the main menu and the popup menu will be described in more detail referring to FIGS. 3A and 3B.

Figure 2:
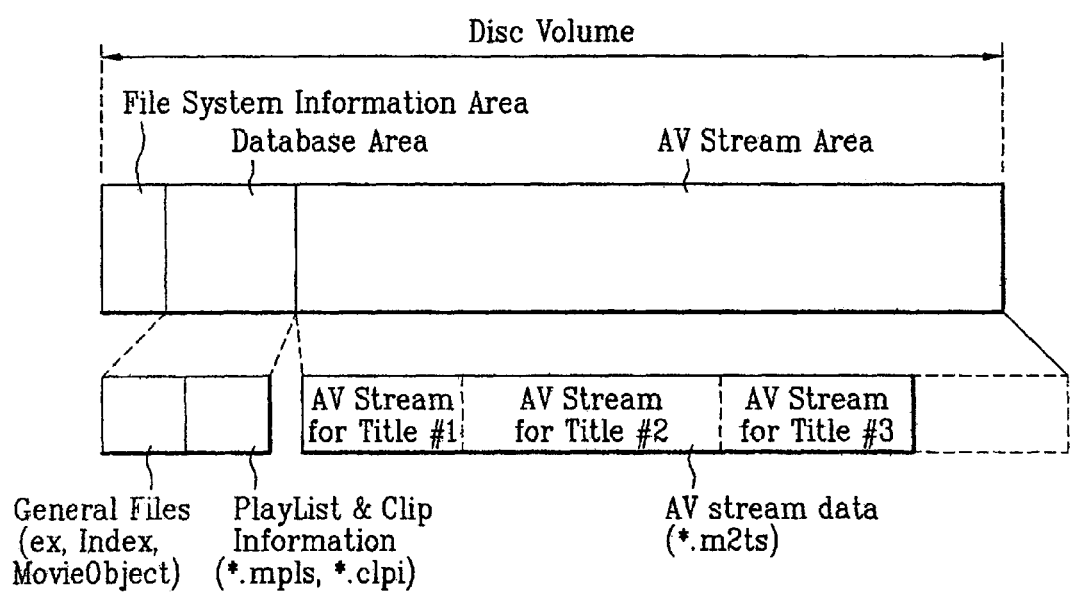
FIG. 2 schematically illustrates a disc volume for storing the file structure of FIG. 1 in accordance with an embodiment of the present invention.

As shown in FIG. 2, the disc volume of a BD-ROM is organized into a file system information area, a database area, and an A/V stream area. The file system information area stores system information for managing the disc. The database area includes a general files area and a playlist and clip information area. The general files area stores general files such as the index.bdmv file and the MovieObject.bdmv file. The playlist and clip information area stores the PLAYLIST directory and the CLIPINF directory. The main data and the supplementary data, such as audio/video/graphic, recorded thereon are stored as the MPEG2 transport stream formatted clip files (*.m2ts) in the A/V stream area.

Figure 3A:
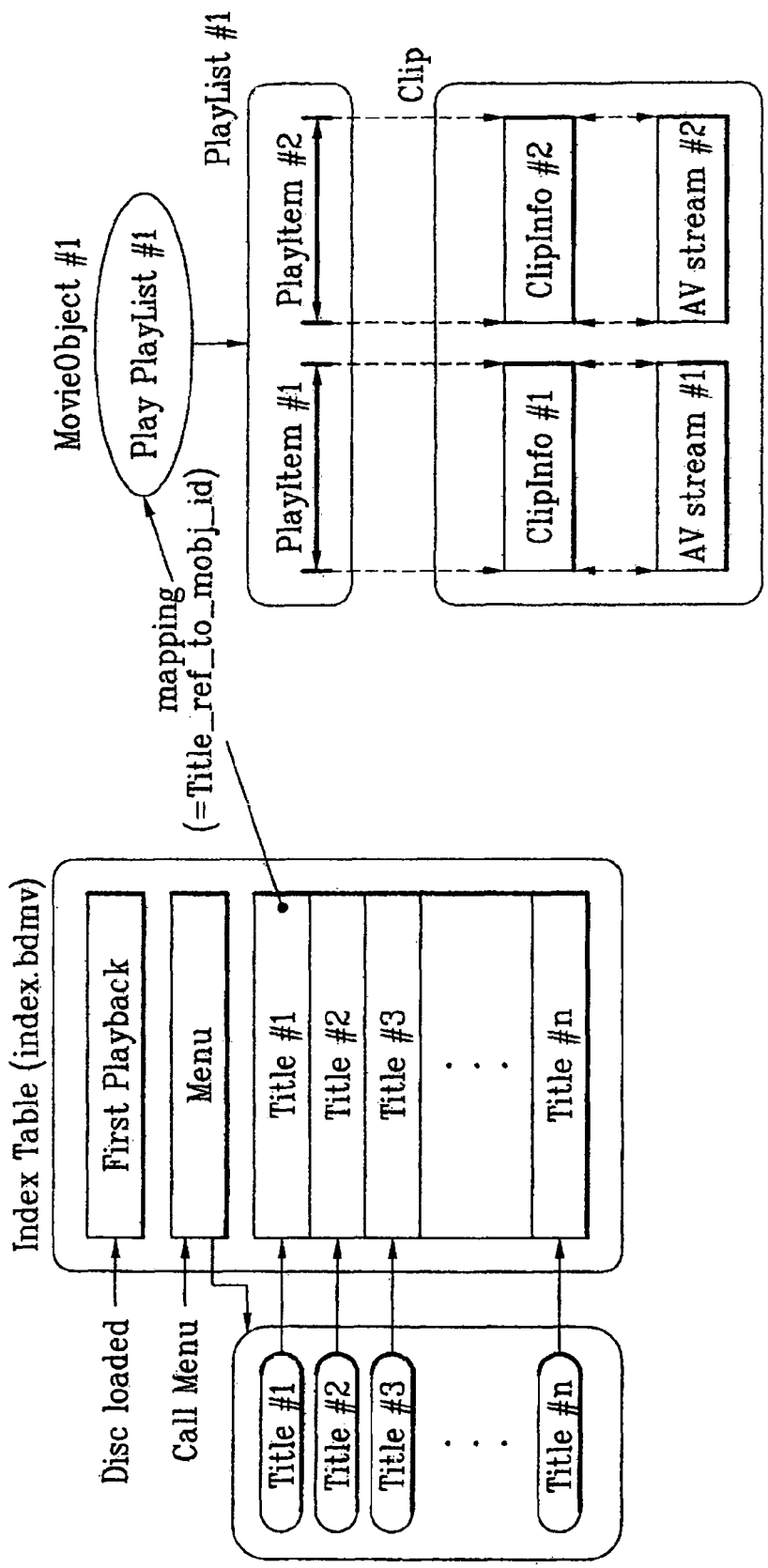
FIGS. 3A to 3B illustrate a data structure of the recording medium (e.g., BD-ROM) for managing graphic information and a method for managing the menu information in accordance with an embodiment of the present invention.
Figure 3B:
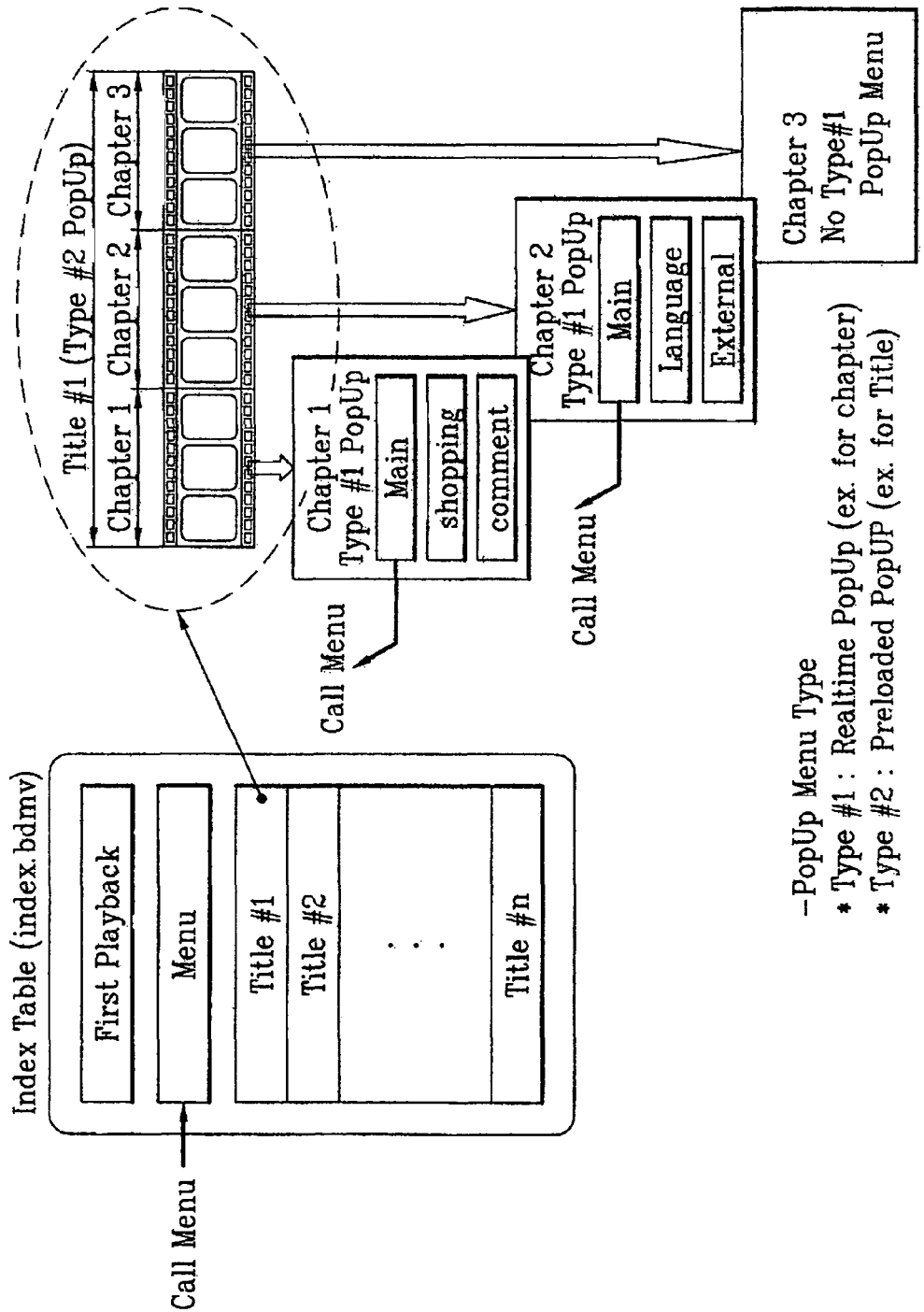

FIGS. 3A to 3B illustrate a data structure of the recording medium (e.g., BD-ROM) for managing graphic information such as a popup menu and a method for managing the menu information in accordance with an embodiment of the present invention. Specifically, FIG. 3A schematically illustrates the file structure provided by the main menu information in the index table, and FIG. 3B illustrates the data structure for managing popup menu information according to an embodiment of the present invention.

As shown in FIG. 3A, the file structure for managing the main menu includes the index file index.bdmv having main menu information. Specifically, the index file index.bdmv includes an Index Table having the main menu information Menu, title information Title #1, . . . , Title #n, and first playback information First Playback. The information in the index table is linked one-to-one with information in the corresponding object file MovieObject.bdmv, which controls reproduction.

Accordingly, the main menu information in the Index Table is performed by a user request "Call Menu", and in the main menu, a basic title menu Title is included. Thus, the user can select from the main menu, one of the titles the user wants to reproduce.

If the user selects Title #1, Title #1 is mapped to an object, e.g., MovieObject #1, designated by the link information, which is included in Title #1 information within the index table, i.e., 'Title_ref_to_mobj_id' information. And, a playlist, e.g., PlayList #1, designated by a command in the corresponding object is played back.

The playlist PlayList #1 is equipped with playitems PlayItem #1 and PlayItem #2 that include navigation information for reproducing Clips #1 and #2, respectively.

The first playback information First Playback in the index table Index Table includes link information that is automatically loaded when the disc is loaded. As such, the playlist file and clip file linked to the first playback information by an object in the object.bdmv file are reproduced, automatically, in the same manner as discussed above with respect to the Title #1.

In the process for reproducing a corresponding title, reproduction starts from the main menu. The main menu is limited to providing general, title based main menu information for the total disc, and there is a limitation in properly providing the main menu according to the attributes of the recorded data.

Owing in part to the above, when the data attributes of the recorded data are different and/or more detailed, separate additional menu information may be provided to the user so as to provide convenience and an environment different from the convention optical disc.

The additional menu information is graphic information called a popup menu. FIG. 3B illustrates the data structure for managing the graphic information forming popup menu information according to an embodiment of the present invention.

First of all, the popup menu is menu information provided according to the attributes of data recorded within each playback unit, whereas the main menu is general information provided for an overall disk.

The 'playback unit' to which the popup menu is applied means a specific playback section to which a disk author applied a popup menu. For instance, a title, chapter or the like may be one 'playback unit' according to the contents thereof. And, even a scene, etc. may be one 'playback unit'.

A 'title' (e.g., a movie) may be considered the biggest unit among the contents in a blue-ray disk (BD), and 'chapters' may be considered as a plurality of smaller playback sections in the title. Accordingly, a popup menu may be configured differently on a title and/or chapter basis.

Also, the present invention provides two types of popup menus. A first type will be referred to as a 'real-time popup menu' or 'first type popup menu (Type #1 PopUp menu)'. The second type will be referred to as a 'preloaded popup menu' or 'second type popup menu (Type #2 PopUp menu)'. Theses two types of popup menus will be described in greater detail below.

As shown in FIG. 3B, the second type popup menu may be used as a title menu and the first type popup menu may be used as chapter menus. In FIG. 3B, the third chapter (chapter #3) does not have an associated first type popup menu and as such becomes a playback section supported by the preloaded popup menu applied to the entire title.

A popup menu may be provided with menu information according to the popup menu type. A disk author also provides various kinds of menu information fitting the data attributes of the playback unit with which the popup menu is associated. For instance, a popup menu enabling chapter and audio language changes within a title may be provided in the preloaded popup menu of Title #1, and various kinds of menu information based on the data attributes of the corresponding chapter may be provided in the real-time popup menu within each chapter. For instance, in FIG. 3B, a popup menu consisting of a menu enabling shopping and a comment menu including enhanced data is provided for chapter #1, and an audio language changeable menu and an 'external' menu for receiving an input signal from outside are provided for chapter #2. A real-time popup menu is not provided to chapter #3.

Moreover, each popup menu is additionally equipped with a menu selection for executing the main menu in the index table. If the corresponding 'main menu' in the popup menu is clicked, the 'Call Menu' command is executed so that the main menu of the index file is executed.

Second, contrary to how the main menu is displayed, the popup menu is displayed overlapping, using a small window, a presently reproduced picture without changing the presently reproduced picture. As such, the presently reproduced picture becomes the background picture. The background picture may be a stilled or paused picture, or may be continuously reproduced without being paused.

Thirdly, the execution of the main or popup menu is based on a user's execution command, e.g., a menu execution button input via a remote controller. In case of the popup menu, various execution commands may be implemented. For instance, for a real-time popup menu, an execution icon displaying that a popup menu exists in a current playback section within a currently displayed image is provided to a user. The user then clicks the corresponding icon to execute the popup menu. In case of the preloaded popup menu, a menu execution button input is made via a remote controller to execute the popup menu. The execution command for the popup menu is named 'PopUp_on'. As mentioned in the foregoing description, it can be seen that each 'PopUp_on' method may differs according to popup menu type, which will be explained in detail below with respect to FIGS. 4 and 5.

In summing up the features of the newly defined popup menu, the popup menu provides menu information based on the data attributes within a specific playback unit. There may exist a plurality of popup menu types, and the disk author selectively determines the popup menu types. Each of the execution commands PopUp_on of the popup menus is separately configured per each popup menu type. The operation of the popup menu is performed while having the background image paused or by maintaining play back of the background image without switching the background image as when the main menu is executed.

The above-configured menu information, and particularly, the configuration per each type of the popup menu and various executing methods thereof are explained by referring to the detailed embodiments of the present invention below.

Figure 4:
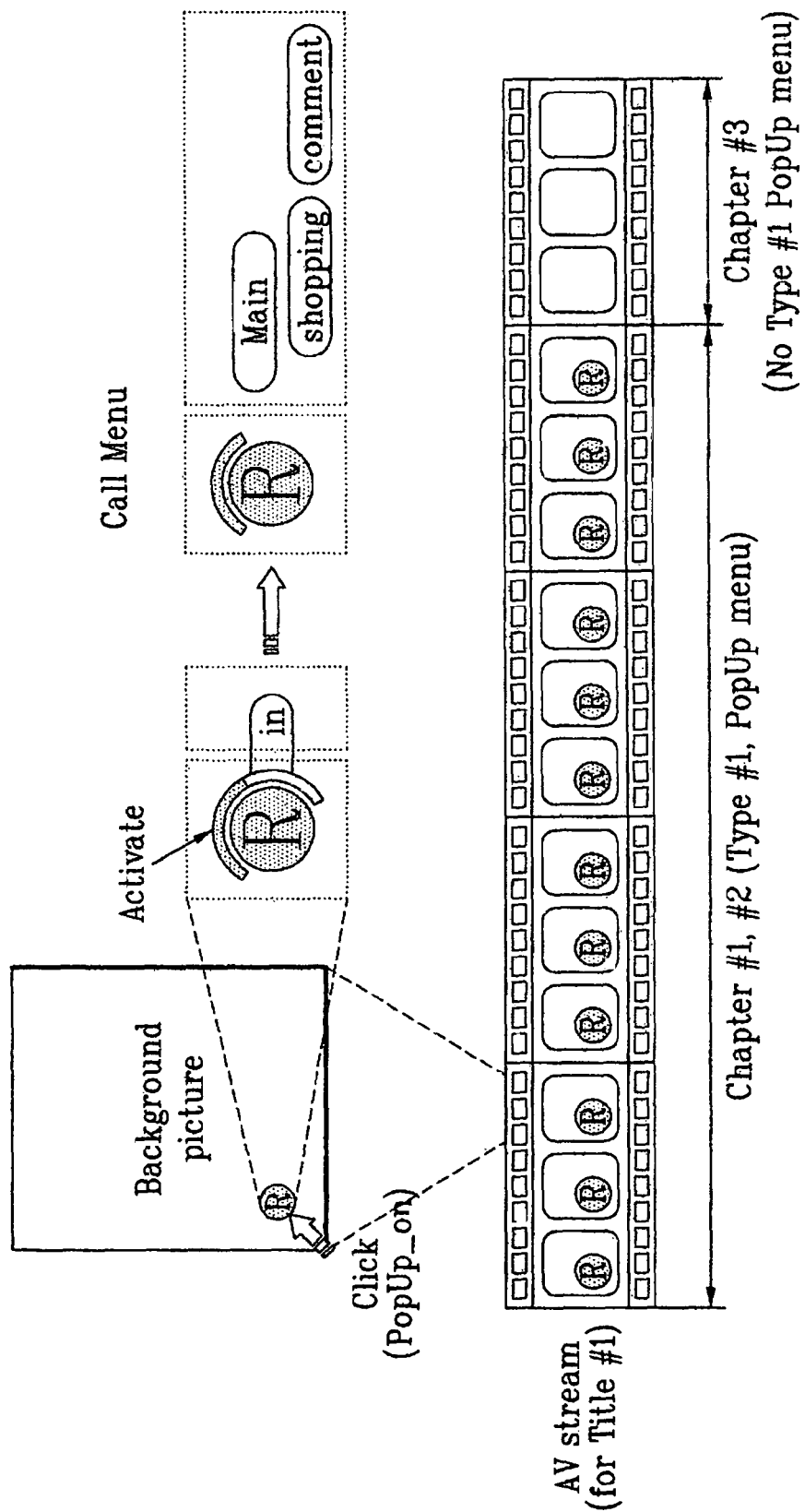
FIG. 4 illustrates an embodiment for managing a real time popup menu according to the present invention.
Figure 5:
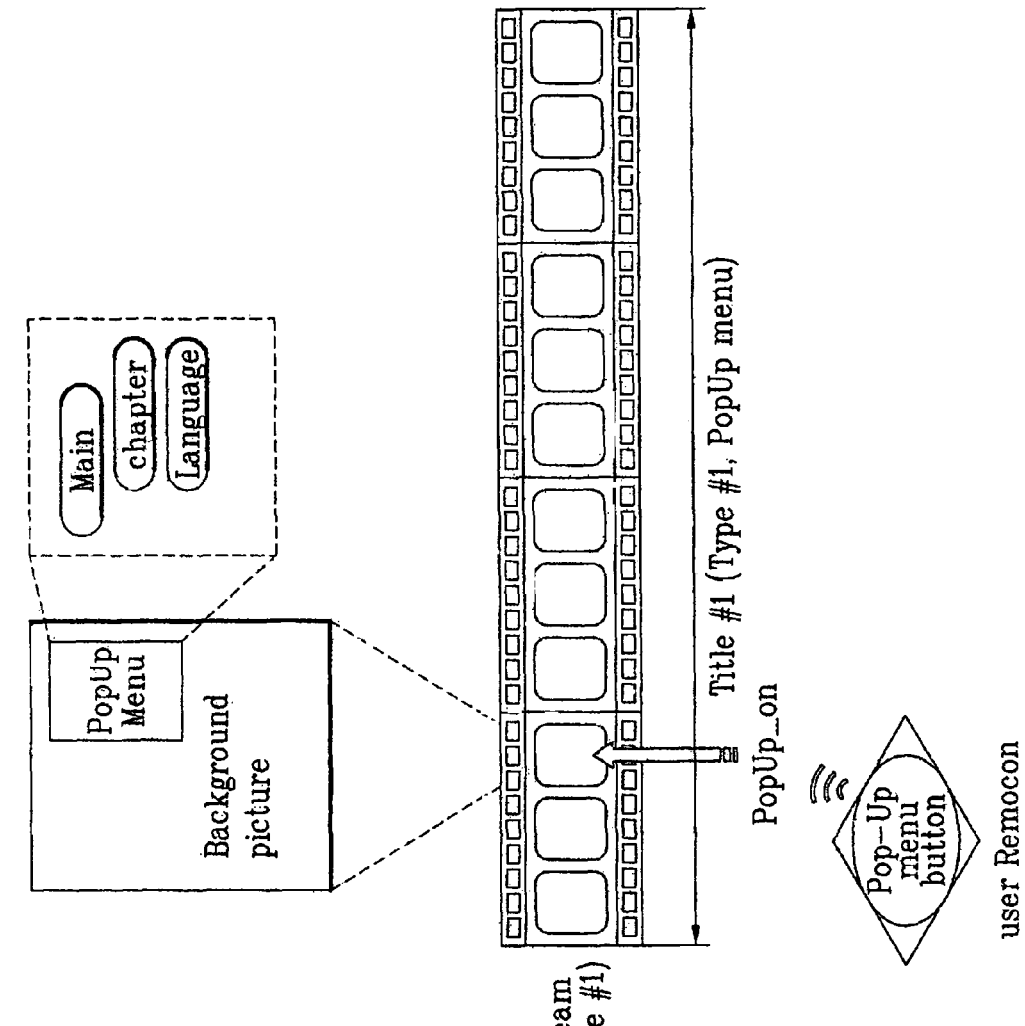
FIG. 5 illustrates an embodiment for managing a preloaded popup menu according to the present invention.
Figure 6A:
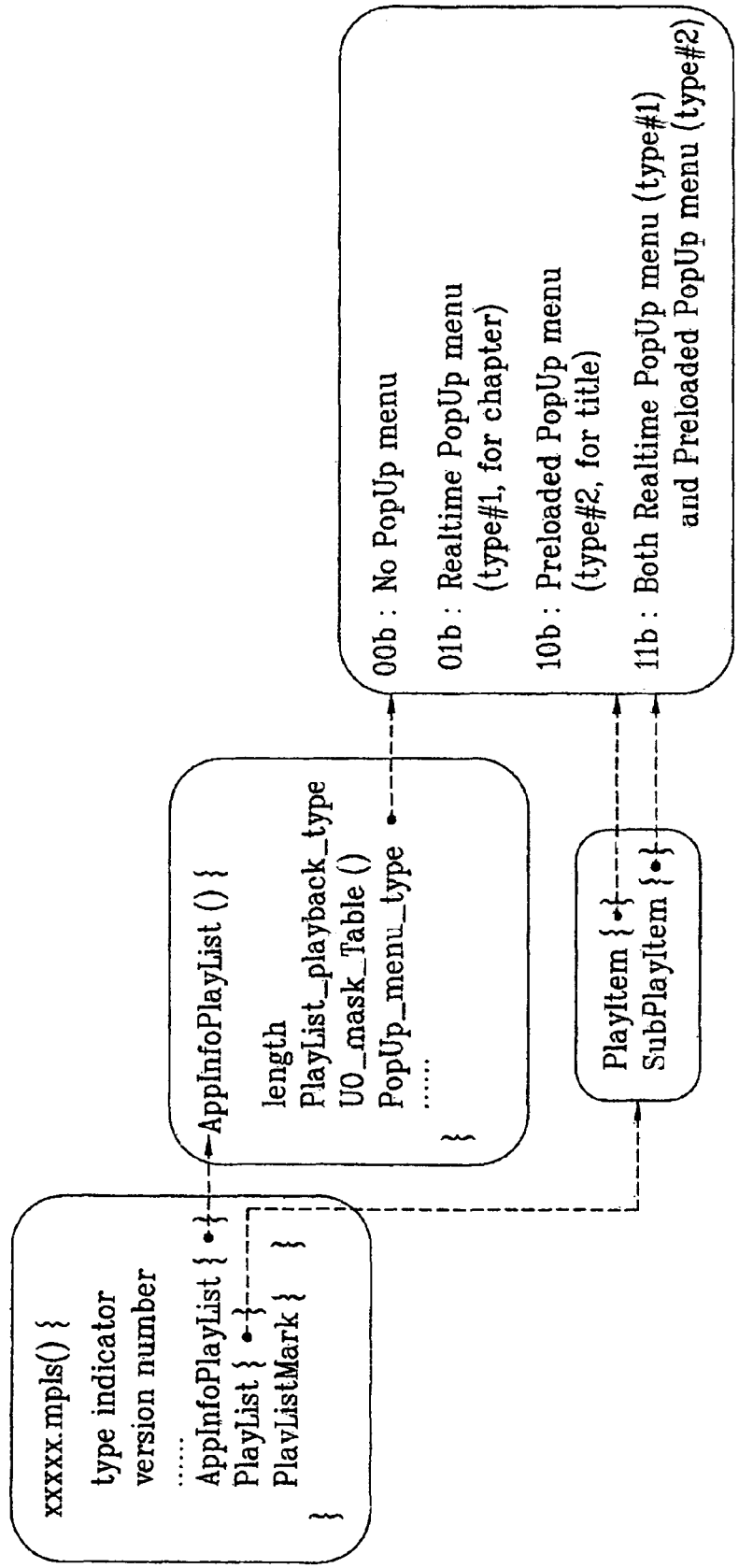
FIGS. 6A to 6C illustrates data structures of the management and identification information according to an embodiment of the present invention.
Figure 6B:
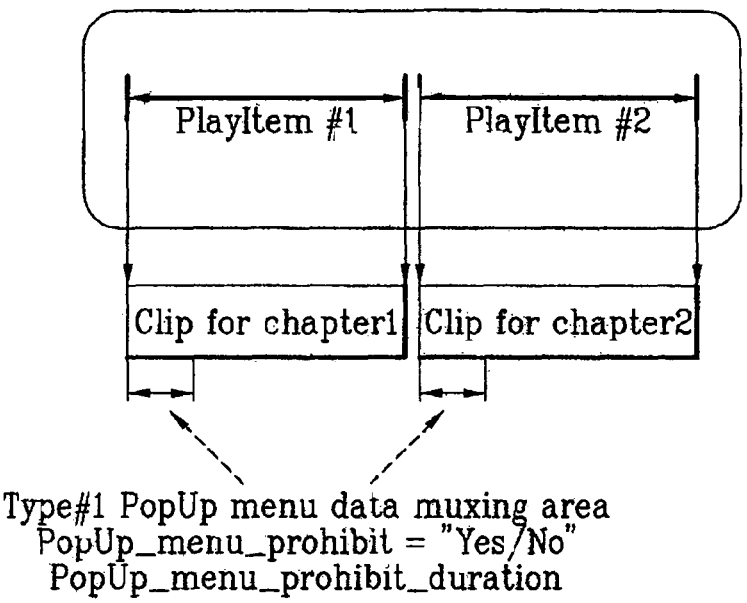
Figure 6C:
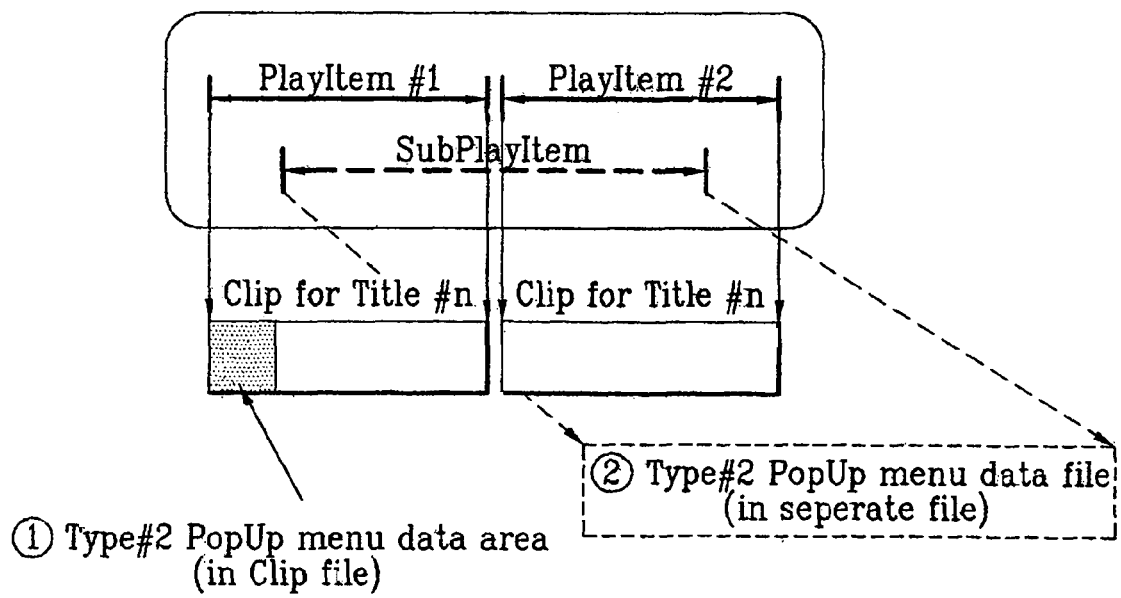

FIGS. 4 and 6A-6B illustrate an embodiment for managing a real time popup menu according to the present invention, and FIGS. 5, 6A and 6C illustrate an embodiment for managing a preloaded popup menu according to the present invention.

First, differences between the real-time popup menu and the preloaded popup menu in these embodiments will be described.

Firstly, the preloaded popup menu is applied to a more global playback unit such as a group of chapters or a title. As such the contents of the preloaded popup menu are more global in nature. On the contrary, the real-time popup menu may be applied to a more specific playback unit such as a chapter in the title. The contents of the real time popup menu are more directly related to the data attributes of the associated playback unit.

Each application of the preloaded popup menu and the real-time popup menu may be performed based on the 'title and chapter' hierarchy. As other examples, the application may be based on the 'title and mark', 'chapter and mark', 'playlist and playitem', 'playlist and mark', 'playlist and clip', or 'title and display set' data structures. Namely, in the embodiments of FIGS. 4 and 5, the real-time popup menu is the popup menu for the smaller playback section within a 'playback unit' associated with the preloaded popup menu. As will be appreciated, the real-time and preloaded popup menus according to these two embodiments of the present invention may be applied regardless of the names of the 'playback unit'.

Secondly, in configuring popup menu data, the preloaded popup menu means graphic information provided by a separate data file distinguished from the file containing the AV data of the corresponding playback unit. The real-time popup menu means graphic information provided by being multiplexed in a file with the AV data of the corresponding playback unit.

Hence, the preloaded popup menu and the real-time popup menu are occasionally named 'on-demand popup menu' and 'dyna-view popup menu', respectively.

Thirdly, for popup menu execution, a selection of a specific popup menu button provided on an external remote controller and the like or an input panel is recognized as the execution command Popup_on. On the contrary, the real-time popup menu is always provided within a played-back image in the form of a specific execution icon, and a reproducing apparatus recognizes a user clicking the corresponding icon as the execution command PopUp_on. Hence, the preloaded popup menu is occasionally referred to as a user request popup menu and the real-time popup menu is occasionally referred to as an always on display popup menu.

A disk author sets up the most efficient popup menu to provide to a user based on the attributes of the recorded data. Hence, the real-time popup menu may not be provided for a specific playback unit, e.g., chapter #3 in FIG. 3B.

FIG. 4 schematically illustrates the configuration and execution of a real-time popup menu. As shown, a user-recognizable execution icon (e.g., a circled 'R' icon) is provided to one side of each playback image (e.g., always on display). If a user clicks the corresponding icon ('PopUp_on'), the corresponding menu information is provided.

For instance, if the real-time popup menu is the same as applied to chapter #1 of FIG. 3B, the activated popup menu includes the menu selections of 'Shopping', 'Comment' and 'Main' menu as discussed above. And, if a specific command is set up in association with a menu selection, the specific command is set up as information utilized in playing back an optical disk. For example, if the main menu is selected (which becomes the 'Call_Menu' command), a current image is switched to a main menu image.

Hence, in the actual implementation of the real-time popup menu according to the embodiment of the present invention, the identical popup menu can be configured within the corresponding playback unit (e.g., chapters #1 or chapter #2 in FIG. 4). As will be appreciated, the playback unit (e.g., chapter #1) may be divided into time-based playback sections, and real-time popup menus having the different menu information may be provided for each of the divided sections.

FIG. 5 schematically illustrates the configuration and execution method of the preloaded popup menu. Here, the corresponding menu information is provided if a user selects a popup menu execution button using an external remote controller or the like (PopUp_on). For instance, unlike the real-time popup menu, which includes an always on display component, the preloaded popup menu is usually not displayed until a user request is received.

If the preloaded popup menu of FIG. 5 is the same as the preloaded popup menu applied to Title #1 of FIG. 3B, the execution command PopUp_on of the popup menu activates display of a popup menu consisting of 'Main' menu, 'Chapter' menu, and 'Language' menu selections. The chapter menu provides for enabling a chapter change. The language menu provides for changing the audio language from a current time point within any section of title #1. A user then selects one of the menus to call up the selected menu. Moreover, if the 'Main' menu is selected (Call_Menu), a current image is switched to a main menu image as discussed previously.

Hence, in the actual implementation of the preloaded popup menu according to the embodiment of the present invention, the popup menu can be configured within the corresponding playback unit (e.g., title #1). As mentioned in the foregoing description, the preloaded popup menu is managed as a menu file separate from the general AV data or is recorded in an area distinguished from general data despite being included in the general AV data. Hence, the preloaded popup menu is preloaded in the corresponding playback unit to be utilized.

Therefore, both of the real-time and preloaded popup menus may be simultaneously utilized in some implementations of the present invention. For instance, with respect to Chapters #1 and #2 of FIG. 3B both of the preloaded popup menu provided for an overall title and the real-time popup menu provided for each chapter in accordance with a user's selection may be activated.

With classifying the popup menus of the present invention into two types and using a specific popup menu type, a data structure for identifying the type of the popup menu in a specific file information per playback unit is provided. Moreover, the present invention provides for distinguishing one case where the popup menu is not applied to a specific playback unit from the other case where both of the popup menus of the two types are applied to the specific playback unit. The data structure for, and method of recording, the identification information for identifying the popup menu type is explained in detail as follows.

FIGS. 6A to 6C illustrates data structures of the management and identification information, identifying a popup menu type, according to embodiments of the present invention.

FIG. 6A illustrates an embodiment of recording popup menu identification information in a playlist file. Referring to FIG. 6A, in the playlist file, there exists a 'AppInfoPlayList { }' data structure recording application information, a 'PlayList { }' data structure recording playitem and sub-playitem information, and a 'PlayListMark { }' data structure recording mark information.

The popup menu type identification information of this embodiment of the present invention is named 'PopUp_menu_type' as a field name and is recorded in the playlist file. 'PopUp_menu_type=00b' means that a popup menu fails to support a corresponding playback unit. 'PopUp_menu_type=01b' means that only a real-time popup menu supports a corresponding playback unit. 'PopUp_menu_type=10b' means that only a preloaded popup menu supports a corresponding playback unit. And, 'PopUp_menu_type=11b' means that a real-time popup menu and a preloaded popup menu support a corresponding playback unit.

The field 'PopUp_menu_type' may be set for each playback unit or for a specific playback section within a playback unit. For instance, the indicator 'PopUp_menu_type' may be defined in 'AppInfoPlayList { }', 'PlayItem { }' or 'SubPlayItem { }' data structures. Moreover, the name of the supported popup menu may be directly included in the file information managing the playback unit supported by the popup menu.

FIG. 6B and FIG. 6C illustrate data structures for managing the 'PopUp_menu_type' recorded in the file structure. FIG. 6B shows the data structure for managing real-time popup menu data and FIG. 6C shows the data structure for managing preloaded popup menu data.

Referring to FIG. 6B, a real-time popup menu exists within a specific playback unit, and particularly, within a chapter. For instance, PlayList #k manages a pair of clips (clip for chapter #1, clip for chapter #2), which are recorded by multiplexing AV stream and graphic information representing a real-time popup menu into MPEG2 transport packets, as a pair of playitems PlayItem #1 and PlayItem #2.

During reproduction, a control unit (an example of which is discussed below with respect to FIG. 7) of an optical recording/reproducing apparatus reads out the real-time popup menu. The real-time popup menu is recorded multiplexed with the AV data. By using the PID (packet ID) of the real-time popup menu packets, which differ from the PID of the AV data packets, the real-time menu packets are filtered out and provided as the corresponding popup menu if a user's real-time popup menu execution command (PopUp_on) is delivered. As will be appreciated based on the description of FIG. 4, a component of the real-time menu is always on display.

In the example of FIG. 6B, the real-time popup menu is recorded by being multiplexed at a front half of the clip. The popup menu is provided in a front or lead portion of the clip because the menu information may be displayed only after the optical recording/reproducing apparatus has read out the graphic data representing the menu.

Yet, in case that the user demands the real-time popup menu execution command even if the optical record playback apparatus fails to read out the entire real-time popup menu data provided within the corresponding chapter, the operation thereof may fail to met the user's demand. In order to prevent such a problem, a function of prohibiting the execution of the popup menu for a specific section or interval (duration) may be introduced. For example, the additional menu control fields—'PopUp_menu_Prohibit_duration or PopUp_menu_waiting_duration' field and/or 'PopUp_menu_Prohibit' field may be provided as shown in FIG. 6B. The 'PopUp_menu_Prohibit_duration or PopUp_menu_waiting_duration' field designates a specific section (e.g., a period of time) of the playback unit during which the execution of the popup menu is prohibited. The 'PopUp_menu_Prohibit' field prohibits/permits the execution of the popup menu. 'PopUp_menu_Prohibit=Yes' is set as a control command indicating that the popup menu execution is prohibited. And, 'PopUp_menu_Prohibit=No' is set as the control command to indicate that execution of the popup menu is permitted. At least one of the 'PopUp_menu_Prohibit_duration or PopUp_menu_waiting_duration' field and 'PopUp_menu_Prohibit' fields may be applied. Moreover, both of the fields may be applied to secure reliability of this function.

FIG. 6C shows the data structure for managing preloaded popup menu data. Referring to FIG. 6C, PlayList #n manages clips (clips for Title #n) having an AV stream recorded therein. Playitems in the PlayList #n include navigation information for reproducing the clips. A separate clip file storing graphic information representing a preloaded popup menu is also recorded. The PlayList #n includes a SubPlayItem (Case 1) having navigation information for reproducing the separate clip file of graphic information. Alternatively, PlayList #1 may record separate preloaded popup menu data in a front portion of a clip (clip for Title #n) having the AV stream (Case 2).

Specifically, even if the preloaded popup menu data is recorded as a separate file (Case 1), in one embodiment, the preloaded popup menu data is recorded physically adjacent to the general AV data. This is advantageous in reducing a time taken for playing back the general AV data after the popup menu data has been preloaded.

Moreover, even if the preloaded popup menu data is recorded in the front portion of the clip (clip for Title #n) having the AV stream recorded therein (Case 2), it is apparent that Case 2 is different from the recording method of the foregoing-mentioned real-time popup menu data in FIG. 6B since the preloaded popup menu data is not multiplexed with the AV stream.

The control unit (an example of which is discussed below with respect to FIG. 7) of the optical record playback apparatus firstly reproduces the preloaded popup menu data via the SubPlayItem or PlayItem before playing back the clip for Title #n from the corresponding PlayList #n, and stores the menu in a memory. Once the user's popup menu execution command PopUp_on is delivered, the preloaded popup menu is provided.

Figure 7:
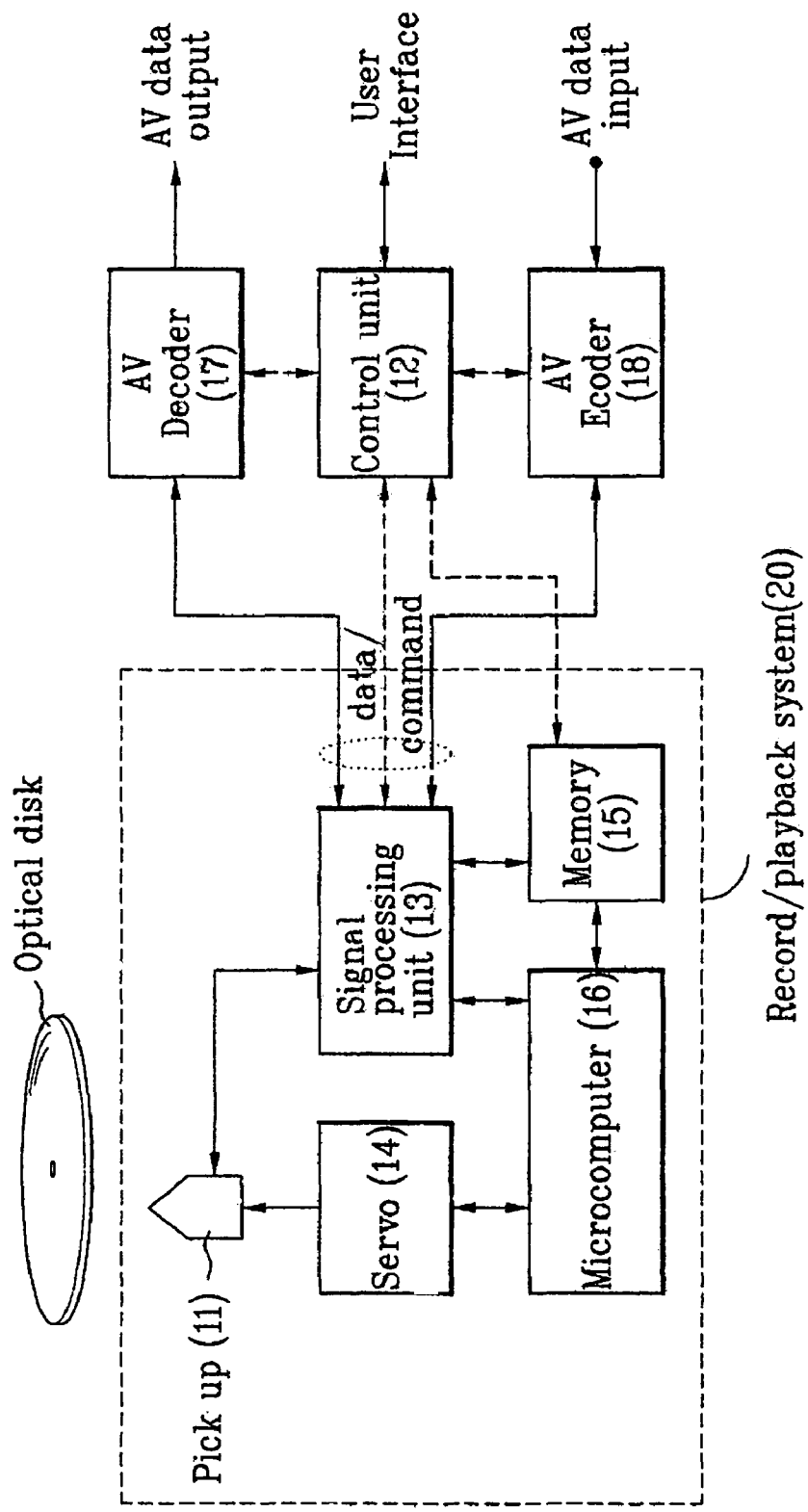
FIG. 7 illustrates an example embodiment of an optical recording/reproducing apparatus according to the present invention.

FIG. 7 illustrates an example embodiment of an optical recording/reproducing apparatus according to the present invention. As shown, the apparatus includes a pickup member 11 for retrieving or recording managing information having data and menu information recorded in the optical disc; a servo or driver 14 for controlling movement of the pickup member 11; a signal processor 13 for demodulating a reproduced signal received from the pickup member 11 into a desired signal value or modulating the signal to be recorded into a signal recorded in the optical disc; a memory 15 for temporarily storing the managing information having the menu information, and a microcomputer 16 for controlling the servo 14, the signal processor 13 and the memory 15. A comprehensive term of above structural elements is a record playback system 20. Particularly, the record playback system 20 performs reproduction based on the data structure as described above with respect to FIGS. 1-6C.

An AV decoder 17 provides the data to the user by decoding output data according to instruction from a controller 12. The AV encoder 17 converts an input signal into a specific format (i.e., MPEG2 transport stream) according to the control of the controller 12, and provides the converted signal to the signal processor 13 in the record playback system 20 for performing the function of recoding the signal to the optical disc.

From the reproduced popup menu type identification information (PopUp_menu_type) recorded on the recording medium, the control unit 12 recognizes whether each specific playback unit is supported by a popup menu and the type or types of popup menu supporting the playback unit. The control unit 12 reads out popup menu data per the recognized type according to a previously defined method such as described with respect to FIGS. 6A to 6C, and then provides the corresponding popup menu to a user if a user's popup menu execution command (PopUp_on) is delivered.

Specifically, when receiving the user's popup menu execution command (PopUp_on), the control unit 12 performs the popup menu execution command (PopUp_on) corresponding to the read-out identification information and may provide an announcement message to a user in response to a popup menu execution command (PopUp_on). This operation is explained in detail by referring to FIG. 8A and FIG. 8B.

Figure 8A:
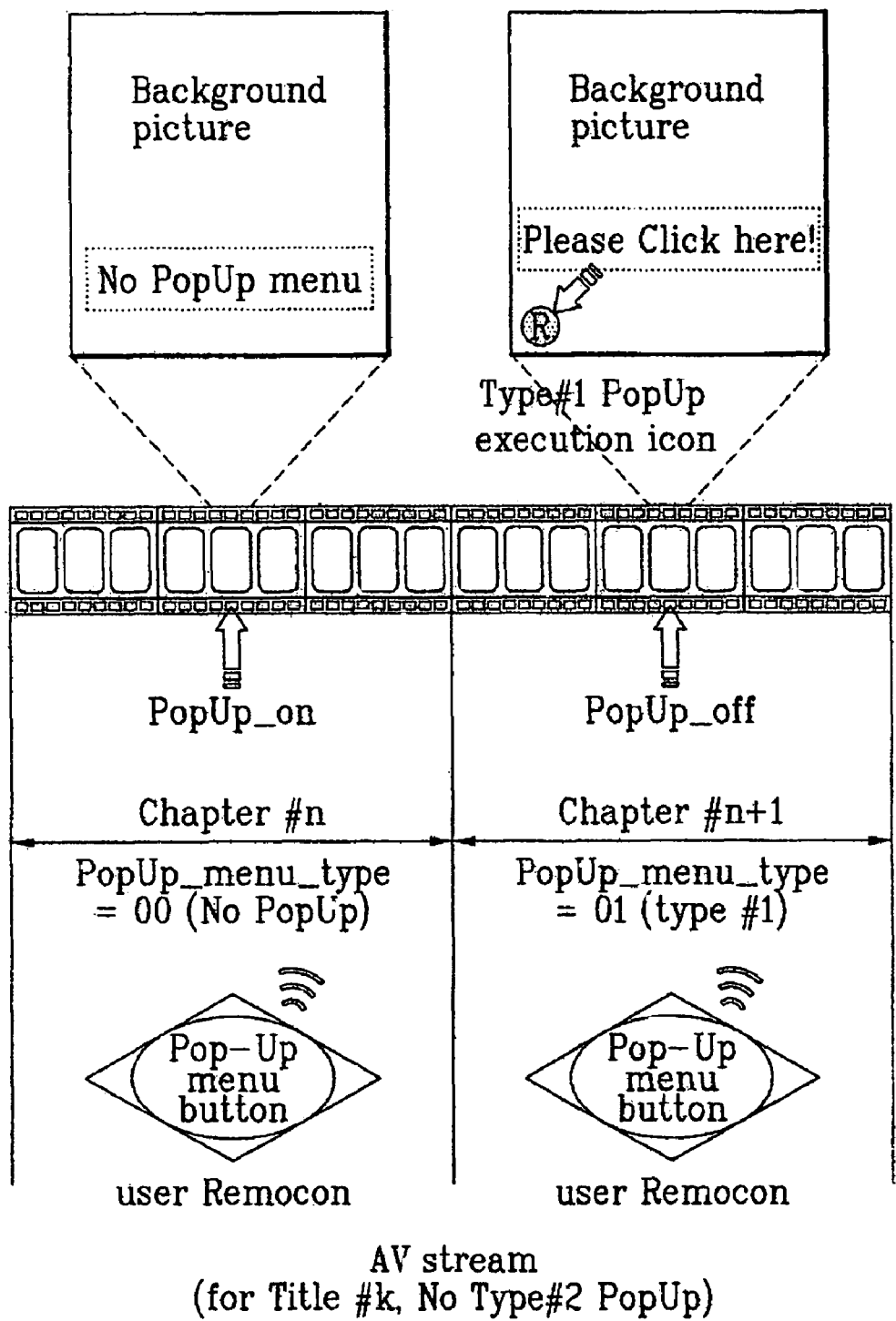
FIG. 8A and FIG. 8B are diagrams illustrating the operation of the optical recording/reproducing apparatus after popup menu type identification information (PopUp_menu_type) per specific playback unit in a disk has been recognized.
Figure 8B:
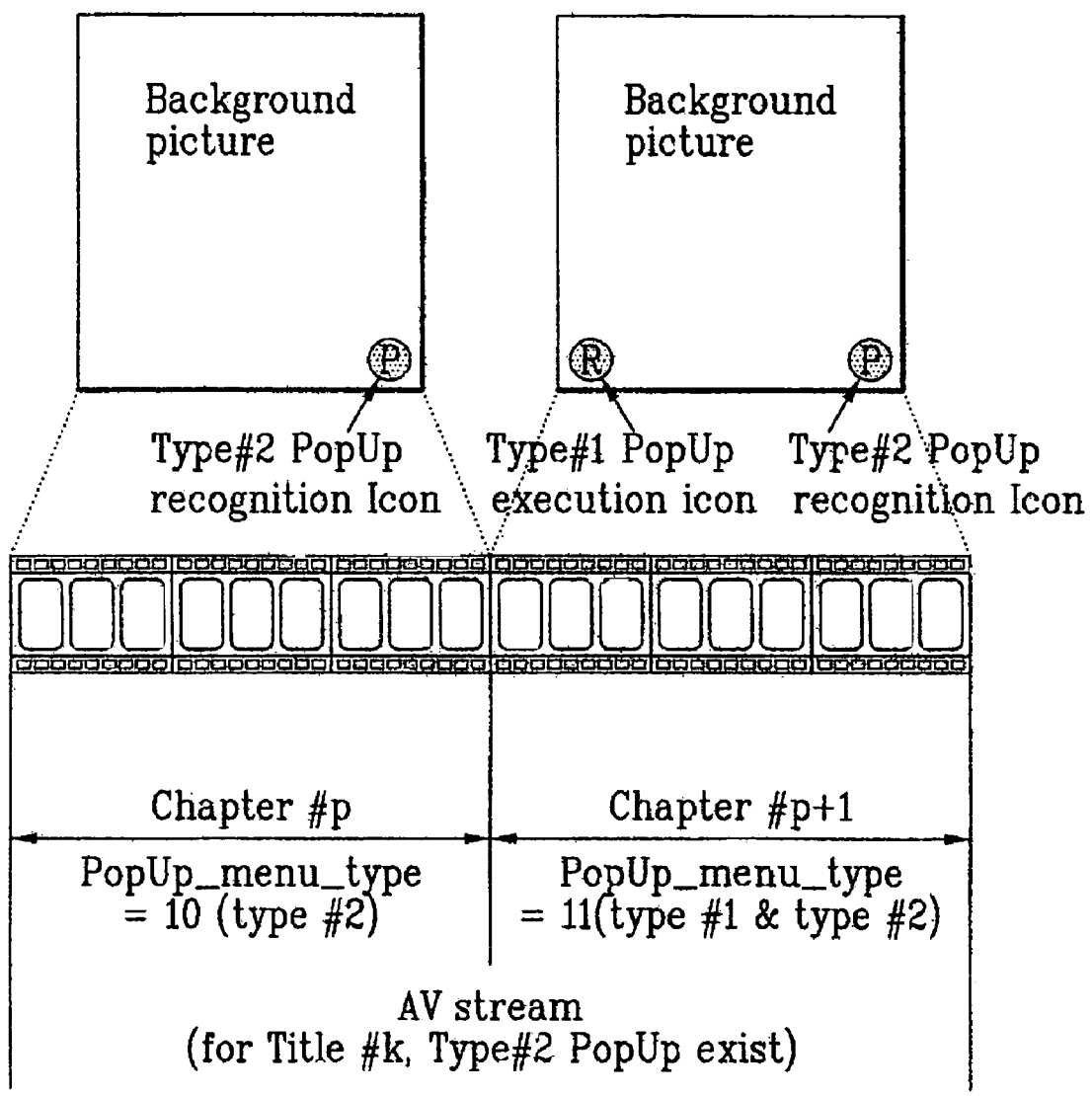

FIG. 8A and FIG. 8B are diagrams illustrating the operation of the optical recording/reproducing apparatus after popup menu type identification information (PopUp_menu_type) per specific playback unit in a disk has been recognized.

FIG. 8A exemplarily shows a case that a preloaded popup menu fails to exist in a specific title Title #k (No Type #2 PopUp), that Chapter #n in the corresponding title even fails to have a real-time popup menu (PopUp_menu_type=00b), and that Chapter #(n+1) in the corresponding title has a real-time popup menu (PopUp_menu_type=01b).

Referring to FIG. 8A, when intending to play back the optical disk having 'PopUp_menu_type=00b' and 'PopUp_menu_type=01b', the optical recording/reproducing apparatus recognizes a popup menu type per each chapter from the popup menu identification information PopUp_menu_type recorded in the disk in association with each chapter. Based on the type indications, the apparatus controls the output of popup menu information.

Specifically, Chapter #n has a type indictor 'PopUp_menu_type=00b' indicating that neither a real-time nor a preload popup menu support Chapter #n. If a preloaded type popup menu execution command PopUp_on (menu button of a remote controller) is delivered from a user in the process of playing back Chapter #n, the apparatus provides the user via a display screen with a message announcing that the popup menu fails to exist. The user has to click an execution icon displayed on the screen to execute the real-time popup menu. Yet, Chapter #n fails to be supported by the real-time popup menu so that the execution icon itself fails to be displayed thereon.

Chapter #(n+1) has a type indicator 'PopUp_menu_type=01b' indicating that Chapter #(n+1) is not supported by a preloaded popup menu but is supported by a real-time popup menu. As such the real-time popup menu execution icon (e.g., circled 'R') is always displayed on one side of a playback image while the corresponding section is played back. If a user clicks the corresponding execution icon, it is recognized as the real-time popup menu execution command to provide the popup menu. If the preloaded popup menu execution command PopUp_on is delivered from the user, the apparatus provides the user via a display screen with the message announcing that there exists no preloaded popup menu. The apparatus may further provide an announcement message leading to the execution of the real-time popup menu. For instance, the message asks the user to click the real-time popup menu execution icon with a message of 'Please Click here!'.

Specifically, Chapter #n or Chapter #(n+1) fails to be supported by the preloaded popup menu. Yet, the user may frequently demand execution by activating a popup menu button using a remote controller and the like unintentionally (which corresponds to the execution command PopUp_on of the preloaded popup menu). Hence, the above methods will be very useful by alerting a user.

FIG. 8B exemplarily shows a case that a preloaded popup menu exists in a specific title Title #k (Type #2 PopUp exist), that Chapter #p in the corresponding title fails to have a real-time popup menu (PopUp_menu_type=10b), and that Chapter #(p+1) in the corresponding title has the real-time popup menu as well as the preloaded popup menu (PopUp_menu_type=11b).

Referring to FIG. 8B, when intending to play back the optical disk having 'PopUp_menu_type=10b' and 'PopUp_menu_type=11b', the recording/reproducing apparatus recognizes a popup menu type per each chapter from the popup menu identification information PopUp_menu_type recorded in the disk with each chapter. Based on the type indications, the apparatus controls the output of popup menu information Specifically, Chapter #p has 'PopUp_menu_type=10b' indicating that Chapter #p is supported by a preloaded popup menu only. If a preloaded type popup menu execution command PopUp_on is delivered from a user in the process of playing back the corresponding section, the popup menu which is preloaded will be provided. Moreover, the optical recording/reproducing playback apparatus in one embodiment may provide a recognition icon (e.g., circled 'P') on one side of a provided image if there exists the preloaded popup menu, thereby informing the user that the preloaded popup menu is supportable in the current playback section. As with Chapter #n in FIG. 8A, Chapter #p fails to be supported by a real-time popup menu so that the real-time popup menu execution icon fails to be displayed thereon. Hence, the real-time popup menu execution command PopUp_on will not be delivered from the user.

Chapter #(p+1) has 'PopUp_menu_type=11b' indicating that Chapter #(p+1) is supported by both a preloaded popup menu and a real-time popup menu. As such, the apparatus is able to provide a popup menu corresponding to each type of user popup menu execution command PopUp_on while the corresponding section is played back. As described above with respect to Chapter #p, a recognition icon enabling the user to recognize that the preloaded popup menu exists may be provided on one side of the screen. In case that the real-time popup menu is supported, the real-time popup menu execution icon will always be displayed on the screen. Hence, it is apparent that a separate real-time popup menu execution indicator will be necessary in this optional embodiment.

In the embodiments described above, the multiplexed or real-time popup menu was described as the always on display menu. Namely, a component of the real-time popup menu is always on display. However, the present invention is not limited to the real-time menu being the popup menu for always on display. Instead, the preloaded popup menu may serve as the menu for always on display.

Similarly, in the embodiment described above, the non-multiplexed or preloaded popup menu was mostly described as a menu that was not displayed until user input requesting display of the menu was received. However, it will be appreciated that the multiplexed or real-time popup menu may serve as a user request menu in which no display takes place until user input requesting display of the menu is received.

To the extent that one type of menu serves as an always on display menu and another type of menu serves as a user request display menu, the type indication information indicates whether a menu is an always on or user request menu.

Furthermore, the above-described embodiments explained a hierarchy for the two menu types; namely, using the preloaded menu for a large playback unit and the real-time menu for a subset of the large playback unit. However, it will be appreciated that the menu types of the present invention are not limited to this hierarchy or limited to having a hierarchical relationship.

While the invention has been disclosed with respect to a limited number of embodiments, those skilled in the art, having the benefit of this disclosure, will appreciate numerous modifications and variations there from. For example, while described with respect to a Blu-ray ROM optical disk in several instances, the present invention is not limited to this standard of optical disk or to optical disks. It is intended that all such modifications and variations fall within the spirit and scope of the invention.

What is claimed is:

1. A non-transitory recording medium storing an executable data structure for managing reproduction of menu information by a reproduction device, the recording medium comprising:

an information area storing menu information and a menu type indicator, the menu information being configured to include at least one of first interactive menu information and second interactive menu information, the first interactive menu information being multiplexed with main data, the first interactive menu information being configured to be displayed overlapping on the main data, the second interactive menu information being configured to be displayed overlapping on the main data, the second interactive menu information being stored separate from a file containing the main data, the menu type indicator indicating which one of interactive menu information is included in the menu information, and a management area storing management information for managing reproduction of the menu information by the reproduction device, wherein the management area stores at least one of a first stream information file and a second stream information file, the first stream information file having a one-to-one correspondence with a first stream file storing the first interactive menu information and the second stream information file having a one-to-one correspondence with a second stream file storing the second interactive menu information, the first and second stream information files respectively including attribute information of data in the first and second stream files, the management area storing one or more playlist files designating a stream file to be reproduced by a corresponding stream information file, wherein the first interactive menu information is configured to be displayed without user request, the first interactive menu information being configured to be on display during an entire duration of a playback-unit to which the first interactive menu information is applied, and the second interactive menu information is configured to be displayed upon user request.

2. A non-transitory recording medium of claim 1, wherein the first and second interactive menu information are graphic data.

3. A non-transitory recording medium of claim 1, wherein the management area stores at least one playitem, the playitem designating the first stream file by a name of the first stream information file and providing navigation information on start and end times for reproducing one of the first and second stream files.

4. A non-transitory recording medium of claim 1, wherein the management area stores at least one subplayitem, the subplayitem designating the second stream file by a name of the second stream information file and providing navigation information on start and end times for reproducing the second stream file.

5. A non-transitory recording medium of claim 1, wherein one of the one or more playlist files includes at least one playitem and at least one subplayitem, the subplayitem designating the second stream file by a name of the second stream information file and providing navigation information on start and end times for reproducing the second stream file, the playitem designating the first stream file by a name of the first stream information file and providing navigation information on start and end times for reproducing the first stream file.

6. A method of reproducing menu information from a recording medium loaded into and reproduced by a reproducing device, the method comprising:

reading, from the recording medium, menu information and a menu type indicator, the menu information being configured to include at least one of first interactive menu information and second interactive menu information, the first interactive menu information being multiplexed with main data, the first interactive menu information being configured to be displayed overlapping on the main data, the second interactive menu information being configured to be displayed overlapping on the main data, the second interactive menu information being stored separate from a file containing the main data, the menu type indicator indicating which one of interactive menu information is included in the menu information;

reading, from the recording medium, management information for managing reproduction of the menu information, the management information including one or more playlist files and at least one of a first stream information file and a second stream information file, the first stream information file having a one-to-one correspondence with a first stream file storing the first interactive menu information and the second stream information file having a one-to-one correspondence with a second stream file storing the second interactive menu information, the first and second stream information files respectively including attribute information of data in the first and second stream files, the one or more playlist files designating a stream file to be reproduced by a corresponding stream information file; and reproducing, from the recording medium, at least one of the first stream file and the second stream file based on the management information, wherein the first interactive menu information is displayed without user request, the first interactive menu information being on display during an entire duration of a playback-unit to which the first interactive menu information is applied, and the second interactive menu information is displayed upon user request.

7. The method of claim 6, further comprising:

outputting the first interactive menu information along with the main data of the first stream file during the duration of the playback-unit without user request; and outputting the second interactive menu information upon request from a user.

8. The method of claim 6, wherein the first stream information file includes timing information of the first stream file, the timing information mapping a presentation time of data in the first stream file to a source packet number of a source packet on the first stream file.

9. The method of claim 8, wherein the first interactive menu information is displayed by using the timing information of the first stream information file.

10. The method of claim 6, wherein the first stream file is reproduced based on navigation information included in at least one playitem recorded on the recording medium, the playitem designating the first stream file by a name of the first stream information file and providing information on start and end times for reproducing the first stream file.

11. The method of claim 6, wherein the second stream file is reproduced based on navigation information included in at least one subplayitem recorded on the recording medium, the subplayitem designating the second stream file by a name of the second stream information file and providing information on start and end times for reproducing the second stream file.

12. A method of recording a data structure for managing reproduction of menu information on a recording medium being loaded into and reproduced by a reproducing device, the method comprising:

recording, onto the recording medium, menu information and a menu type indicator, the menu information being configured to include at least one of first interactive menu information and second interactive menu information, the first interactive menu information being multiplexed with main data, the first interactive menu information being configured to be displayed overlapping on the main data, the second interactive menu information being configured to be displayed overlapping on the main data, the second interactive menu information being stored separate from a file containing the main data, the menu type indicator indicating which one of interactive menu information is included in the menu information; and recording, onto the recording medium, management information for managing reproduction of the menu information, the management information including one or more playlist files and at least one of a first stream information file and a second stream information file, the first stream information file having a one-to-one correspondence with a first stream file storing the first interactive menu information and the second stream information file having a one-to-one correspondence with a second stream file storing the second interactive menu information, the first and second stream information files respectively including attribute information of data in the first and second stream files, the one or more playlist files designating a stream file to be reproduced by a corresponding stream information file, wherein the first interactive menu information is displayed without user request, the first interactive menu information being on display during an entire duration of a playback-unit to which the first interactive menu information is applied, and the second interactive menu information is displayed upon user request.

13. The method of claim 12, further comprising:
recording at least one playitem onto the recording medium, the playitem designating the first stream file by a name of the first stream information file and providing navigation information on start and end times for reproducing the first stream file.

14. The method of claim 12, further comprising:
recording at least one subplayitem onto the recording medium, the subplayitem designating the second stream file by a name of the second stream information file and providing navigation information on start and end times for reproducing the second stream file.

15. An apparatus for reproducing menu information from a recording medium, comprising:
a reproducing device configured to reproduce information from the recording medium; and
a controller configured to control the reproducing device to
read, from the recording medium, menu information and a menu type indicator, the menu information being configured to include at least one of first interactive menu information and second interactive menu information, the first interactive menu information being multiplexed with main data, the first interactive menu information being configured to be displayed overlapping on the main data, the second interactive menu information being configured to be displayed overlapping on the main data, the second interactive menu information being stored separate from a file containing the main data, the menu type indicator indicating which one of interactive menu information is included in the menu information,
read, from the recording medium, management information for managing reproduction of the menu information, the management information including one or more playlist files and at least one of a first stream information file and a second stream information file, the first stream information file having a one-to-one correspondence with a first stream file storing the first interactive menu information and the second stream information file having a one-to-one correspondence with a second stream file storing the second interactive menu information, the first and second stream information files respectively including attribute information of data in the first and second stream files, the one or more playlist files designating a stream file to be reproduced by a corresponding stream information file, and
reproduce, from the recording medium, at least one of the first stream file and the second stream file based on the management information, wherein the controller is configured to control the first interactive menu information to be displayed without user requests the first interactive menu information being configured to be displayed during an entire duration of a playback-unit to which the first interactive menu information is applied, and the controller is configured to control the second interactive menu information to be displayed upon request from a user.

16. The apparatus of claim 15, wherein the controller is configured to control reproduction of the first stream file based on navigation information included in at least one playitem recorded on the recording medium, the playitem being configured to designate the first stream file by a name of the first stream information file and provide information on start and end times for reproducing the first stream file.

17. The apparatus of claim 15, wherein the controller is configured to control reproduction of the second stream file based on navigation information included in at least one subplayitem recorded on the recording medium, the subplayitem being configured to designate the second stream file by a name of the second stream information file and to provide information on start and end times for reproducing the second stream file.

18. The apparatus of claim 15, wherein the controller is configured to control reproduction of a playlist file from the recording medium, the playlist file including at least one playitem and at least one subplayitem, the subplayitem being configured to designate the second stream file by a name of the second stream information file and to provide navigation information on start and end times for reproducing the second stream file, the playitem being configured to designate the first stream file by a name of the first stream information file and to provide navigation information on start and end times for reproducing the first stream file.

19. The apparatus of claim 18, wherein the controller is configured to control reproduction of the first and second stream information files from the recording medium.

20. The apparatus of claim 15, wherein the reproducing device includes a pickup configured to reproduce data from the recording medium according to a command transmitted from the controller.

21. The apparatus of claim 15, wherein the controller is configured to control display of the first interactive menu information by using timing information of the first stream information file, the timing information being configured to map a presentation time of data in the first stream file to a source packet number of a source packet on the first stream file.

22. The apparatus of claim 15, wherein the reproducing device includes
a pickup configured to retrieve data recorded in the recording medium;
a servo configured to control movement of the pickup;
a signal processor configured to demodulate a reproduced signal received from the pickup;
a memory configured to store data temporarily; and
a microcomputer configured to control the servo, the signal processor and the memory, wherein the reproducing device is configured to reproduce data from the recording medium according to a command transmitted from the controller.

23. An apparatus for recording a data structure for managing reproduction of menu information on a recording medium, comprising:
a recording device configured to record information on the recording medium; and
a controller configured to control the recording device to record, onto the recording medium, menu information and a menu type indicator, the menu information being configured to include at least one of first interactive menu information and second interactive menu information, the first interactive menu information being multiplexed with main data, the first interactive menu information being configured to be displayed overlapping on the main data, the second interactive menu information being configured to be displayed overlapping on the main data, the second interactive menu information being stored separate from a file containing the main data, the menu type indicator indicating which one of interactive menu information is included in the menu information, and the controller being configured to control the recording device to record, onto the recording medium, management information for managing reproduction of the menu information, the management information including one or more playlist files and at least one of a first stream information file and a second stream information file, the first stream information file having a one-to-one correspondence with a first stream file storing the first interactive menu information and the second stream information file having a one-to-one correspondence with a second stream file storing the second interactive menu information, the first and second stream information files respectively including attribute information of data in the first and second stream files, the one or more playlist files being configured to designate a stream file to be reproduced by a corresponding stream information file, wherein the first interactive menu information is displayed without user request, the first interactive menu information being configured to be on display during an entire duration of a playback-unit to which the first interactive menu information is applied, and the second interactive menu information is displayed upon user request.

24. The apparatus of claim 23, wherein the recording device includes:
a pickup configured to record data onto the recording medium;
a servo configured to control movement of the pickup;
a signal processor configured to modulate a signal to be recorded by the pickup;
a memory configured to store data temporarily; and
a microcomputer configured to control the servo, the signal processor and the memory,
wherein the recording device is configured to record data onto the recording medium according to a command transmitted from the controller.

25. The apparatus of claim 23, wherein the controller is configured to control recording of at least one playitem on the recording medium, the playitem being configured to designate the first stream file by a name of the first stream information file and to provide navigation information on start and end times for reproducing the first stream file.

26. The apparatus of claim 23, wherein the controller is configured to control recording of at least one subplayitem on the recording medium, the subplayitem being configured to designate the second stream file by a name of the second stream information file and to provide navigation information on start and end times for reproducing the second stream file.

27. The apparatus of claim 23, wherein the controller is configured to control recording of a playlist file on the recording medium, the playlist file including at least one playitem and at least one subplayitem, the subplayitem being configured to designate the second stream file by a name of the second stream information file and to provide navigation information on start and end times for reproducing the second stream file, the playitem being configured to designate the first stream file by a name of the first stream information file and to provide navigation information on start and end times for reproducing the first stream file.

28. The apparatus of claim 27, wherein the controller is configured to control recording of the first and second stream information files onto the recording medium, the first stream information file including attribute information of data in the first stream file, the second stream information file including attribute information of data in the second stream file.

29. The apparatus of claim 23, wherein the recording device includes a pickup configured to record data onto the recording medium according to a command transmitted from the controller.

* * * * *